United States Patent
Morikawa

(10) Patent No.: US 10,748,257 B2
(45) Date of Patent: Aug. 18, 2020

(54) POINT CLOUD COLORIZATION WITH OCCLUSION DETECTION

(71) Applicant: TOPCON CORPORATION, Itabashi-ku, Tokyo (JP)

(72) Inventor: Naoki Morikawa, Tokyo (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 232 days.

(21) Appl. No.: 16/023,765

(22) Filed: Jun. 29, 2018

(65) Prior Publication Data
US 2020/0005438 A1    Jan. 2, 2020

(51) Int. Cl.
| | |
|---|---|
| G06T 15/04 | (2011.01) |
| G06T 15/06 | (2011.01) |
| G06T 17/00 | (2006.01) |
| G06T 5/00 | (2006.01) |
| G06T 5/50 | (2006.01) |
| G06T 11/00 | (2006.01) |

(52) U.S. Cl.
CPC .............. G06T 5/005 (2013.01); G06T 5/50 (2013.01); G06T 11/001 (2013.01); G06T 15/04 (2013.01); G06T 15/06 (2013.01); G06T 17/00 (2013.01); G06T 2207/10024 (2013.01); G06T 2207/10028 (2013.01)

(58) Field of Classification Search
CPC .. G06T 5/005; G06T 5/50; G06T 7/50; G06T 11/001; G06T 15/04; G06T 15/06; G06T 17/00; G06T 2207/10024; G06T 2207/10028
See application file for complete search history.

(56) References Cited

U.S. PATENT DOCUMENTS

| | | | |
|---|---|---|---|
| 2014/0184749 A1 | 7/2014 | Hilliges et al. | |
| 2016/0044240 A1* | 2/2016 | Beers | G06T 7/344 348/36 |
| 2017/0039436 A1* | 2/2017 | Chen | G06K 9/4628 |
| 2018/0063510 A1* | 3/2018 | Wolke | H04N 5/23293 |
| 2018/0096525 A1* | 4/2018 | Turner | G06T 17/20 |

(Continued)

OTHER PUBLICATIONS

Abdelhafiz et al. ("Towards a 3D true colored space by the fusion of laser scanner point cloud and digital photos," Proceedings of the ISPRS Working Group V/4 Workshop 3D-ARCH, Aug. 22-24, 2005) (Year: 2005).*

(Continued)

Primary Examiner — Yubin Hung
(74) Attorney, Agent, or Firm — Chiesa Shahinian & Giantomasi PC

(57) ABSTRACT

Systems and methods are described for colorizing a point cloud comprising a set of point cloud data points associated with a particular object using a plurality of candidate images. For each respective data point in the set of point cloud data points, an image is selected, from a subset of the plurality of candidate images that include an un-occluded point of the particular object corresponding to the respective data point, that has a shortest subject distance to the un-occluded point of the particular object. The respective data point is colorized based on a color in the selected image of the un-occluded point of the particular object corresponding to the respective data point.

20 Claims, 10 Drawing Sheets

(56) References Cited

U.S. PATENT DOCUMENTS

2018/0253593 A1* 9/2018 Hu .......................... G06T 7/55

OTHER PUBLICATIONS

Guidi et al. ("Multi-scale archeological survey based on th eintegration of 3D scanning and photogrammetry," Proceedings of the Intern. Workshop on Scanning for Cultural Heritage Recording—Complementing or Replacing Photogrammetry, Sep. 1-2, 2002) (Year: 2002).*

Cho et al. ("Efficient Colorization of Large-Scale Point Cloud Using Multi-pass Z-Ordering," IEEE 2nd International Conference on 3D Vision, vol. 1, Dec. 8-11, 2014) (Year: 2014).*

Arikan et al. ("Large-Scale Point-Cloud Visualization through Localized Textured Surface Reconstruction," IEEE Transactions on Visualization and Computer Graphics, vol. 20, Issue 9, Sep. 2014) (Year: 2014).*

Crombez et al., "3D Point Cloud Model Colonization by Dense Registration of Digital Images", The International Archives of the Photogrammetry, Remote Sensing and Spatial Information Sciences, vol. XL-5/W4, 2015, 3D Virtual Reconstruction and Visualization of Complex Architectures, Feb. 25-27, 2015, 123-130 pgs.

"Shadow Mapping", retrieved from the Internet on Jun. 25, 2018, https://en.wikipedia.org/wiki/Shadow_mapping, 7 pgs.

"Tutorial 16: Shadow mapping", retrieved from the Internet on Jun. 25, 2018, http://www.opengl-tutorial.org/intermediate-tutorials/turorial-16-shadow-mapping/, 23 pgs.

Extended European Search Report dated Mar. 11, 2020, in connection with European Patent Application No. 19175933.1, filed May 22, 2019, 17 pgs.

Sergeeva et al., "Using Structure from Motion for Monument 3D Reconstruction from Images with Heterogeneous Background," 2018 7th Mediterranean Conference on Embedded Computing, IEEE, Jun. 10, 2018, pp. 1-4.

Katz et al., "Direct Visibility of Point Sets", ACM Transactions on Graphics (TOG), 2007, vol. 26, No. 3, 11 pgs.

Maver et al., "Occlusions as a Guide for Planning the Next View", IEEE Transactions on Pattern Analysis and Machine Intelligence, 1993, vol. 15, No. 5, pp. 417-433.

Banta et al., "A Next-Best-View System for Autonomous 3-D Object Reconstruction", IEEE Transactions on Systems, Man and Cybernetics—Part A: Systems and Humans, 2000, vol. 30, No. 5, pp. 589-598.

Partial European Search Report dated Nov. 8, 2019, in connection with European Patent Application No. 19175933.1, 18 pgs.

\* cited by examiner

900

```
┌─────────────────────────────────┐
│ Determine a subject distance to each │
│ specific coordinate of a plurality of │
│ coordinates of the respective image │
│              902                │
└─────────────────────────────────┘
                 │
                 ▼
┌─────────────────────────────────┐
│ Represent each specific coordinate based │
│ on its subject distance to that specific │
│ coordinate in the respective image to │
│       provide a depth map       │
│              904                │
└─────────────────────────────────┘
                 │
                 ▼
┌─────────────────────────────────┐
│ Store the subject distance to each specific │
│ coordinate in the respective image in the │
│           depth map             │
│              906                │
└─────────────────────────────────┘
```

Fig. 9

POINT CLOUD COLORIZATION WITH OCCLUSION DETECTION

BACKGROUND

The present invention relates generally to point cloud colorization, and more particularly to point cloud colorization with occlusion detection.

A point cloud is a set of data points associated with the 3D (three-dimensional) representation of objects or structures. A point cloud is generated using a 3D scanner system, such as, e.g., a mobile mapping system, a terrestrial laser scanner, or LiDAR (light detection and ranging) system. The 3D scanner system measures a set of data points corresponding to surfaces of an object and outputs the set of data points in a 3D coordinate system as the point cloud. However, a point cloud generated by such a 3D scanner does not include color information for the scanned objects.

Conventionally, point clouds are colorized using images acquired from cameras mounted on the 3D scanner system or from an external database of previously acquired images. The point cloud and the images are geo-referenced to a global coordinate system based on position information estimated from GNSS (global navigation satellite systems), IMUs (inertial measurement units), and/or wheel sensors. Each data point of the point cloud is colorized using the color value at a georeferenced coordinate of the data point in an image closest to that data point. However, where the data point is occluded in its closest image, the color value of the occluding object is incorrectly applied to colorize the data point. For example, where a white pole occludes a data point in an image closest to that data point, the data point is incorrectly colorized with the white color of the pole according to conventional approaches.

One approach for overcoming the problems associated with occlusions is to apply ray casting algorithms to search for another point in the image between the camera and the point of the point cloud currently being colored. However, such approach is computationally expensive and not feasible for mass data applications. Further, since the images being used are not spatially close to the point currently being colored, the accuracy of the mapping is low due to sensor error and position error of the system.

BRIEF SUMMARY

In one embodiment, systems and methods are described for colorizing a point cloud comprising a set of point cloud data points associated with a particular object using a plurality of candidate images. For each respective data point in the set of point cloud data points, an image is selected, from a subset of the plurality of candidate images that include an un-occluded point of the particular object corresponding to the respective data point, that has a shortest subject distance to the un-occluded point of the particular object. The respective data point is colorized based on a color in the selected image of the un-occluded point of the particular object corresponding to the respective data point.

In one embodiment, the image is selected by identifying the subset of the plurality of candidate images and then determining a candidate image, from the identified subset of the plurality of images, that has a shortest subject distance to the un-occluded point of the particular object to be the selected image. The subset of the plurality of candidate images may be identified by performing a comparison between: 1) a distance from an image acquisition device that acquired the respective candidate image to a location on the particular object corresponding to the respective data point at a time that the image acquisition device acquired the respective candidate image, and 2) a subject distance to a particular point in the respective candidate image corresponding to the respective data point. It is determined whether the respective candidate image includes an un-occluded point of the particular object based on the comparison. In one example, it is determined whether the respective candidate image includes an un-occluded point of the particular object when the comparison satisfies an error threshold.

In one embodiment, the image is selected by a) identifying a candidate image, from a specific set of candidate images initially comprising the plurality of candidate images, having a shortest subject distance to a particular point corresponding to the respective data point; and b) determining whether the particular point in the identified candidate image is the un-occluded point of the particular object. In response to determining that the particular point in the identified candidate image is not the un-occluded point of the particular object (i.e., the particular object is occluded at the particular point in the image), the identified candidate image is removed from the specific set of candidate images and steps a) and b) are repeated until it is determined that the particular point does not occlude the particular object in the identified candidate image. In response to determining that the particular point in the identified candidate image is the un-occluded point of the particular object (i.e., the particular object is not occluded at the particular point in the image), the selected image is determined to be the identified candidate image. In one embodiment, it is determined whether the particular point in the identified candidate image is the un-occluded point of the particular object by performing a comparison between: 1) a distance from an image acquisition device that acquired the identified candidate image to a location on the particular object corresponding to the respective data point at a time that the image acquisition device acquired the identified candidate image, and 2) a subject distance to the particular point in the identified candidate image. It is determined whether the particular point in the identified candidate image is the un-occluded point of the particular object based on the comparison. In one example, it is determined whether the particular point in the identified candidate image is the un-occluded point of the particular object when the comparison satisfies an error threshold.

In one embodiment, the respective data point is colorized based on the selected image by extracting a color value from the selected image of the un-occluded point of the particular object and assigning the extracted color value to the respective data point.

In one embodiment, the image is selected by determining that the un-occluded point in the selected image should not be masked based on a pixel intensity value at a coordinate in a mask image corresponding to the particular point. For example, the un-occluded point in the selected image should not be masked when the pixel intensity value is zero.

In one embodiment, the un-occluded point of the particular object corresponding to the respective data point is determined by mapping a coordinate of the respective data point in a coordinate system of the point cloud to a coordinate in a coordinate system of the selected image.

These and other advantages of the invention will be apparent to those of ordinary skill in the art by reference to the following detailed description and the accompanying drawings.

BRIEF DESCRIPTION OF THE DRAWINGS

FIG. 9 shows a method for generating a depth map, in accordance with one embodiment.

DETAILED DESCRIPTION

Figure 1:
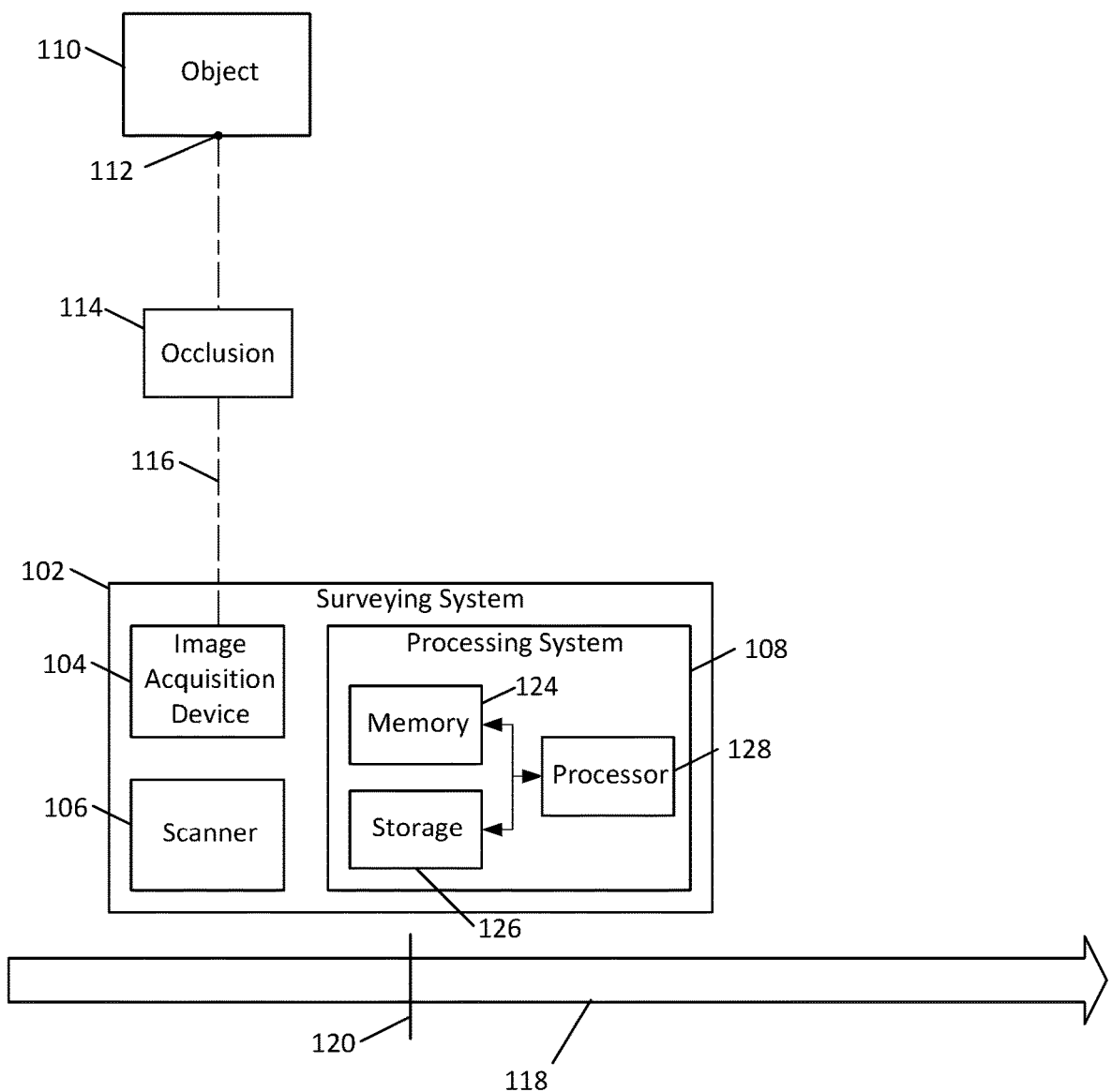
FIG. 1 shows an environment at a time T1 in which a line of sight of an image acquisition device to an object is occluded, in accordance with one embodiment.

FIG. 1 shows an environment 100 at a time T1, in accordance with one or more embodiments. Environment 100 includes object 110 to be scanned by a surveying system 102 for generating a colorized point cloud of object 110. The colorized point cloud may be used for a number of different applications, such as, e.g., modeling of environment 100.

Object 110 may include any object of interest within environment 100, such as, e.g., a building or other structure. Surveying system 102 collects data on environment 100 as surveying system 102 travels along path 118 (e.g., a road) for generating a colorized point cloud of object 110. Surveying system 102 may be mounted on a vehicle for traveling along path 118.

Surveying system 102 includes one or more image acquisition devices 104, a scanner 106, and a processing system 108. Scanner 106 may be any device suitable for generating a point cloud of object 110. In one embodiment, scanner 106 is a laser scanner, such as, e.g., a known LiDAR imaging scanner. Image acquisition device 104 may be any image acquisition device suitable for acquiring color images of object 110 such as, e.g., a 360 degree panoramic camera, a wide angle camera, and/or a telephoto camera. Processing system 108 includes memory 124 (e.g., random access memory) and storage 126 (e.g., persistent storage) operatively coupled to one or more processors 128. Storage 126 may store computer program instructions to perform, e.g., the steps of FIGS. 6, 7, and 9 for colorizing the point cloud generated by scanner 106 using images acquired by image acquisition device 104. Storage 126 may also store the point cloud generated by scanner 106 and the images acquired by image acquisition device 104. The computer program instructions may be loaded into memory 124 and executed by processor 128. While image acquisition device 104, scanner 106, and processing system 108 are shown as part of surveying system 102, it should be understood that image acquisition device 104, scanner 106, and processing system 108 may be discrete components. For example, processing system 108 may be a discrete component located remotely from image acquisition device 104 and scanner 106.

Scanner 106 scans environment 100 to generate the point cloud of object 110 as surveying system 102 travels over path 118. The point cloud may be stored in storage 126 and comprise a set of point cloud data points corresponding to a 3D representation of exterior surfaces of object 110. The set of data points are defined by a 3D coordinate system of the point cloud, such as, e.g., the Cartesian coordinate system representing the data points in X, Y, and Z coordinates. For example, scanner 106 may be a laser scanner that transmits one or more laser light pulses to object 110. A portion of the light is reflected back from object 110. Scanner 106 detects the reflected light and measures its round trip travel time to determine the distance to a point (e.g., point 112) on an exterior surface of object 110. This distance information is obtained for a plurality of points over one or more exterior surfaces of object 110, thereby resulting in the set of data points of the point cloud. FIG. 1 shows an exemplary point 112 on an exterior surface of object 110. Point 112 on a surface of object 110 corresponds to, or is represented by, a point cloud data point.

The point cloud provides 3D spatial information of object 110 in environment 100 but does not include color information of object 110. The color information of object 110 may be determined using images of object 110. In one embodiment, image acquisition device 104 acquires a plurality of images as surveying system 102 travels along path 118. The plurality of images may be stored in storage 126. Image acquisition device 104 may acquire at least some of the plurality of images at a same time or different time as scanner 106 scans object 110. Alternatively, separate image acquisition device may acquire the plurality of images at a same time or a different time as scanner 106 scans object 110 or as image acquisition device 104 acquires images. In one embodiment, the plurality of images may include images previously acquired by image acquisition device 104 or another image acquisition device and stored in a database.

Figure 2:
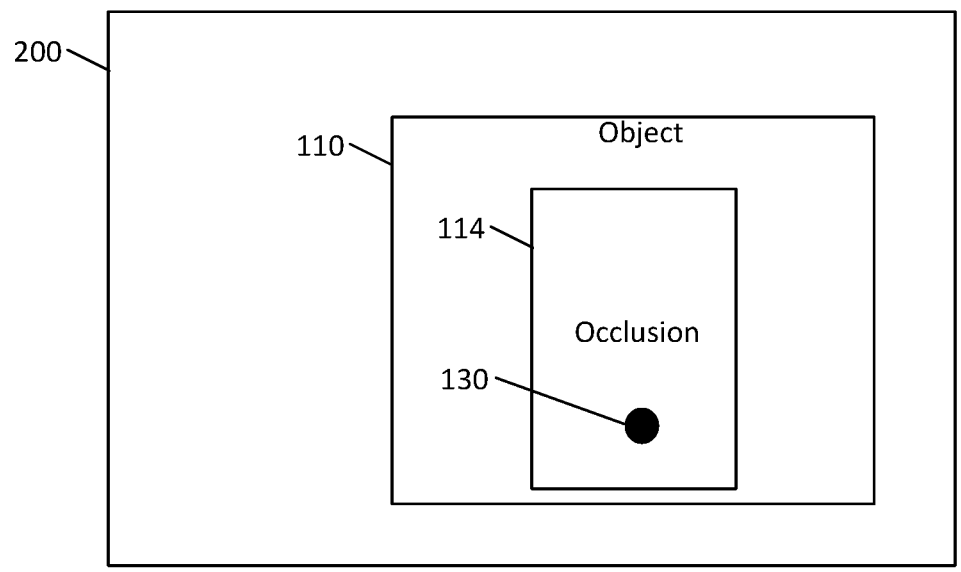
FIG. 2 shows an image generated by the image acquisition device at time T1.

Referring to FIG. 2, with continued reference to FIG. 1, image acquisition device 104 generates image 200 at position 120 and time T1 (in accordance with environment 100 in FIG. 1). As shown in FIG. 1, line of sight 116 of image acquisition device 104 to point 112 is occluded by occlusion 114 when surveying system 102 is at position 120 at time T1. Accordingly, point 112 on a surface of object 110 is not visible in image 200. Image point 130 is a location (e.g., a 2D coordinate) in image 200 that corresponds to the 3D coordinate of the data point representing point 112. In one embodiment, image point 130 is determined by mapping the 3D coordinate of the data point to the 2D coordinate of image 200 using Equation 1, as discussed below. Since occlusion 114 occludes point 112 on a surface of object 110 in image 200, image point 130 represents (e.g., depicts) a point on occlusion 114, instead of point 112 on a surface of object 110. Occlusion 114 may be any object occluding, at least in part, point 112 in image 200. Examples of occlusion 114 may include a vehicle, a tree, a pole, etc. It should be understood that image 200 may include any number of image points corresponding to different data points in the set of data points, where the different data points corresponding to points on a surface of object 110 that may or may not be visible in image 200.

Figure 3:
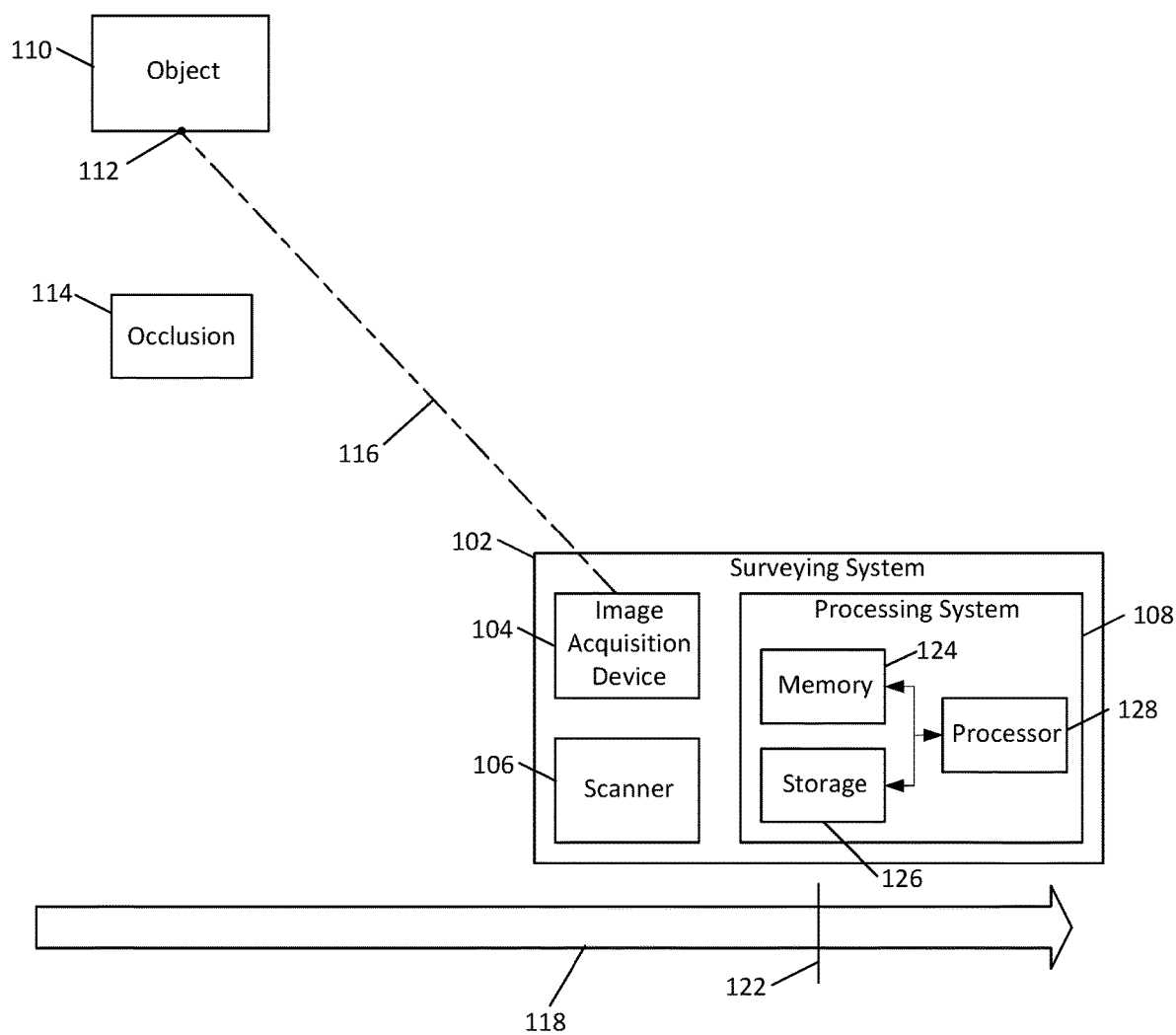
FIG. 3 shows an environment at a time T2 in which a line of sight of an image acquisition device to an object is not occluded, in accordance with one embodiment.

FIG. 3 shows environment 100 in which surveying system 102 is at position 122 on path 118 at a later time T2. While time T2 is described as being a time in the future with respect to time T1, it should be understood that time T2 may alternatively be a time in the past with respect to time T1.

Figure 4:
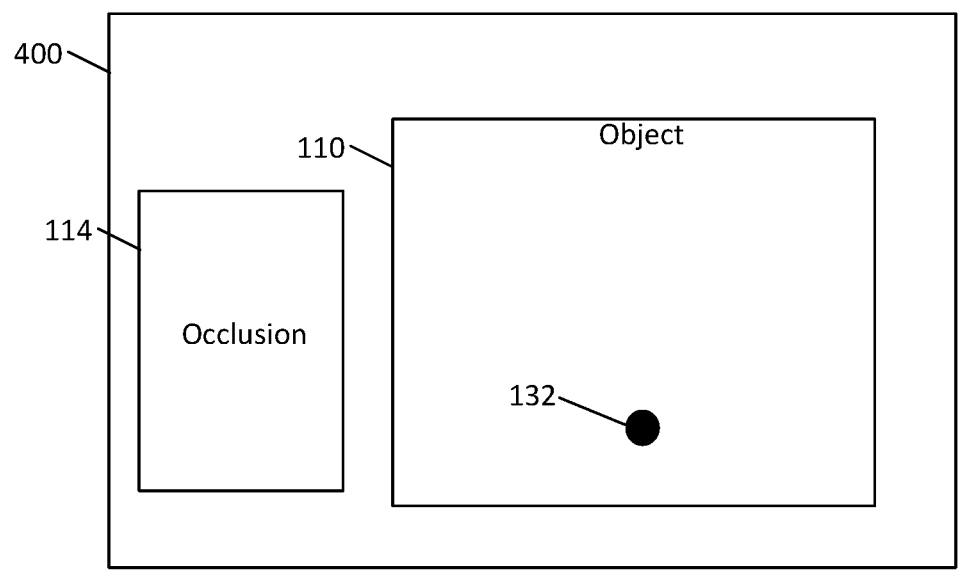
FIG. 4 shows an image generated by the image acquisition device at time T2, in accordance with one embodiment.

Referring to FIG. 4, with continued reference to FIG. 3, image acquisition device 104 generates image 400 at position 122 and time T2 (in accordance with environment 100 in FIG. 3). As shown in FIG. 3, line of sight 116 of image acquisition device 104 to point 112 is not occluded by occlusion 114 at position 122 and time T2. Accordingly, point 112 on object 110 is visible in image 400. Image point 132 is a location (e.g., a 2D coordinate) in image 400 that corresponds to the 3D coordinate of the data point representing point 112. In one embodiment, image point 132 is determined by mapping the 3D coordinate of the data point to a 2D coordinate of image 400 using Equation 1, as described below. Since point 112 on a surface of object 110 is not occluded by occlusion 114, image point 132 in image 400 is an un-occluded point of point 112 on object 110 corresponding to the respective data point (e.g., image point 132 in image 400 represents or depicts point 112). It should be understood that image 400 may include any number of image points corresponding to different data points in the set of data points, where the different data points corresponding to points on a surface of object 110 that may or may not be visible in image 400.

Scanner 106 generates the point cloud of object 110 and image acquisition device 104 acquires the plurality of images during a pre-processing stage. During a post-processing stage, processing system 108 colorizes the point cloud generated by scanner 106 using the plurality of images acquired by image acquisition device 104. In particular, processing system 108 colorizes each data point associated with object 110 in the point cloud by selecting, from a subset of a plurality of candidate images that include an un-occluded point of object 110 corresponding to the respective data point, an image having a shortest subject distance to the un-occluded point of the particular object and colorizing each data point based on a color in the selected image of the un-occluded point of the particular object corresponding to that data point. As used herein, the subject distance to a point (e.g., a coordinate) in an image is defined as the distance between the image acquisition device and a location on a subject (e.g., object 110 or occlusion 114) corresponding to the point in the image at the time that the image was acquired by the image acquisition device. The subject distance may be measured with respect to any point on image acquisition device 104, such as, e.g., the front lens of image acquisition device 104.

Figure 5A:
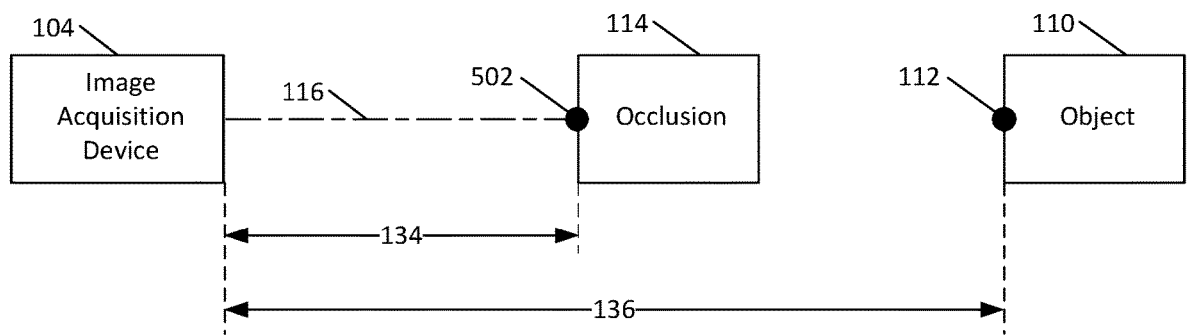
FIG. 5A is a block diagram illustrating the subject distance to a point for the image shown in FIG. 2.

Referring to FIG. 5A, with reference to FIGS. 1 and 2, a subject distance 134 to image point 130 in image 200 is illustratively depicted, in accordance with one embodiment. Image 200 of FIG. 2 shows image point 130, which corresponds to a location 502 on occlusion 114. In one embodiment, image point 130 on image 200 is mapped to location 502, e.g., using Equation 1 below. Subject distance 134 to image point 130 in image 200 is the distance between image acquisition device 104 and location 502 on occlusion 114 at a time T1 image acquisition device 104 acquired image 200.

FIG. 5A shows a measured distance 136 as the distance between image acquisition device 104 and point 112 (e.g., as determined from the point cloud) at a time T1 that image acquisition device 104 acquired image 200. As point 112 is occluded by occlusion 114, subject distance 134 is smaller than measured distance 136.

Figure 5B:
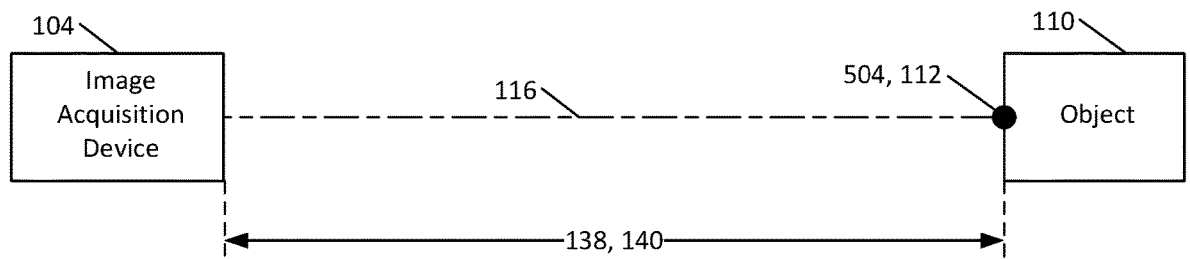
FIG. 5B is a block diagram illustrating the subject distance to a point for the image shown in FIG. 4.

Referring to FIG. 5B, with reference to FIGS. 3 and 4, a subject distance 138 to image point 132 in image 400 is illustratively depicted, in accordance with one embodiment. Image 400 of FIG. 4 shows image point 132, which corresponds to a location 504 on object 110. In one embodiment, image point 132 on image 400 is mapped to location 504, e.g., using Equation 1 below. Subject distance 138 to point 132 in image 400 is the distance between image acquisition device 104 and location 504 on object 110 at a time T2 image acquisition device 104 acquired image 400.

FIG. 5B shows a measured distance 140 as the distance between image acquisition device 104 and point 112 (e.g., determined from the point cloud) at a time T2 that image acquisition device 104 acquired image 400. As point 112 is not occluded, subject distance 138 is substantially the same as measured distance 140 (or within an error threshold).

An image having a shorter subject distance to a point provides more accurate color details of the point than an image with a longer subject distance to the point. Advantageously, processing system 108 of FIG. 1 colorizes each data point of the point cloud for an object using an image having a shortest subject distance to an un-occluded point of the object that corresponds to that data point. Accordingly, the embodiments described herein provide for a point cloud colorized with a higher degree of accuracy and lower amount of artifacts compared to conventional techniques.

Figure 6:
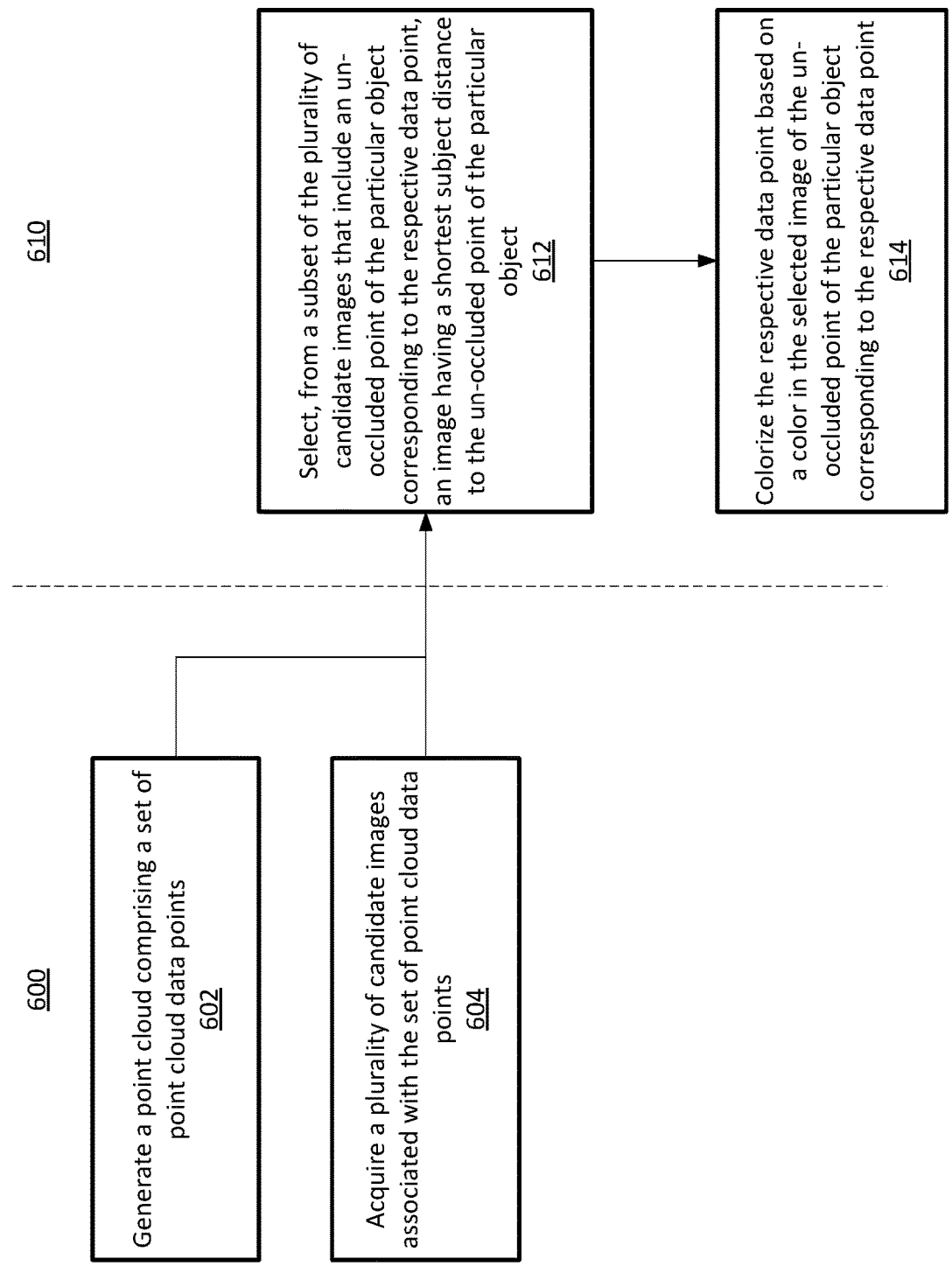
FIG. 6 shows a method for colorizing a data point of a point cloud, in accordance with one embodiment.

FIG. 6 shows a method 600 for colorizing a data point of a point cloud, in accordance with one or more embodiments. Method 600 will be described with respect to environment 100 in FIGS. 1 and 3. Method 600 comprises steps 602 and 604 of pre-processing stage 600 and steps 612 and 614 of post-processing stage 610.

During pre-processing stage 600, at step 602, a point cloud is generated, e.g., by scanner 106 of FIGS. 1 and 3. The point cloud comprises data points for a scanned environment 100. The data points may include a set of point cloud data points associated with an object 110. For example, set of data points may include one or more (e.g., all) data points associated with object 110. At step 604, a plurality of candidate color images associated with the set of data points is acquired, e.g., by image acquisition device 104. The set of candidate images may comprise one or more images that are candidates for colorizing the set of data points. In one embodiment, the set of candidate images may selected from all images acquired by image acquisition device 104 that are spatially close to a point corresponding to a data point in the set of data points or that are temporally close to a time of the acquisition of a data point in the set of data points. For example, the set of candidate images may be selected as images that are acquired within a predetermined distance to a point corresponding to a data point in the set of data points or images acquired within a predetermined time to the acquisition of a data point in the set of data points. In another example, the set of candidate images may be selected as a predetermined number of images (e.g., 10 images) that are spatially closest to the position of a point corresponding to a data point in the set of data points or that are temporally closest to a time of the acquisition of a data point in the set of data points. In one embodiment, the set of candidate images associated with the respective data point may include previously acquired images stored in a database. Image 200 of FIG. 2 and image 400 of FIG. 4 are examples of images that may be included in the set of candidate images. It should be understood that steps 602 and 604 may be performed at a same time or different times in any order. The set of data points of the point cloud generated at step 602 and the set of candidate images for each respective data point acquired at step 604 may be stored in storage 126 of processing system 108.

Post-processing stage 610 may be performed to colorize the point cloud generated at step 602 using the plurality of candidate images acquired at step 604. Steps 612 and 614 of post-processing stage 610 may be performed, e.g., by processing system 108 for each respective data point in the set of data points associated with object 110 to thereby colorize the point cloud of object 110.

At step 612, an image is selected, from a subset of the plurality of candidate images that include an un-occluded point of the particular object corresponding to the respective data point, that has a shortest subject distance to the un-occluded point of the particular object. The image may be selected from the plurality of candidate images acquired at step 604. In one embodiment, step 612 is performed by performing method 700 of FIG. 7.

Figure 7:
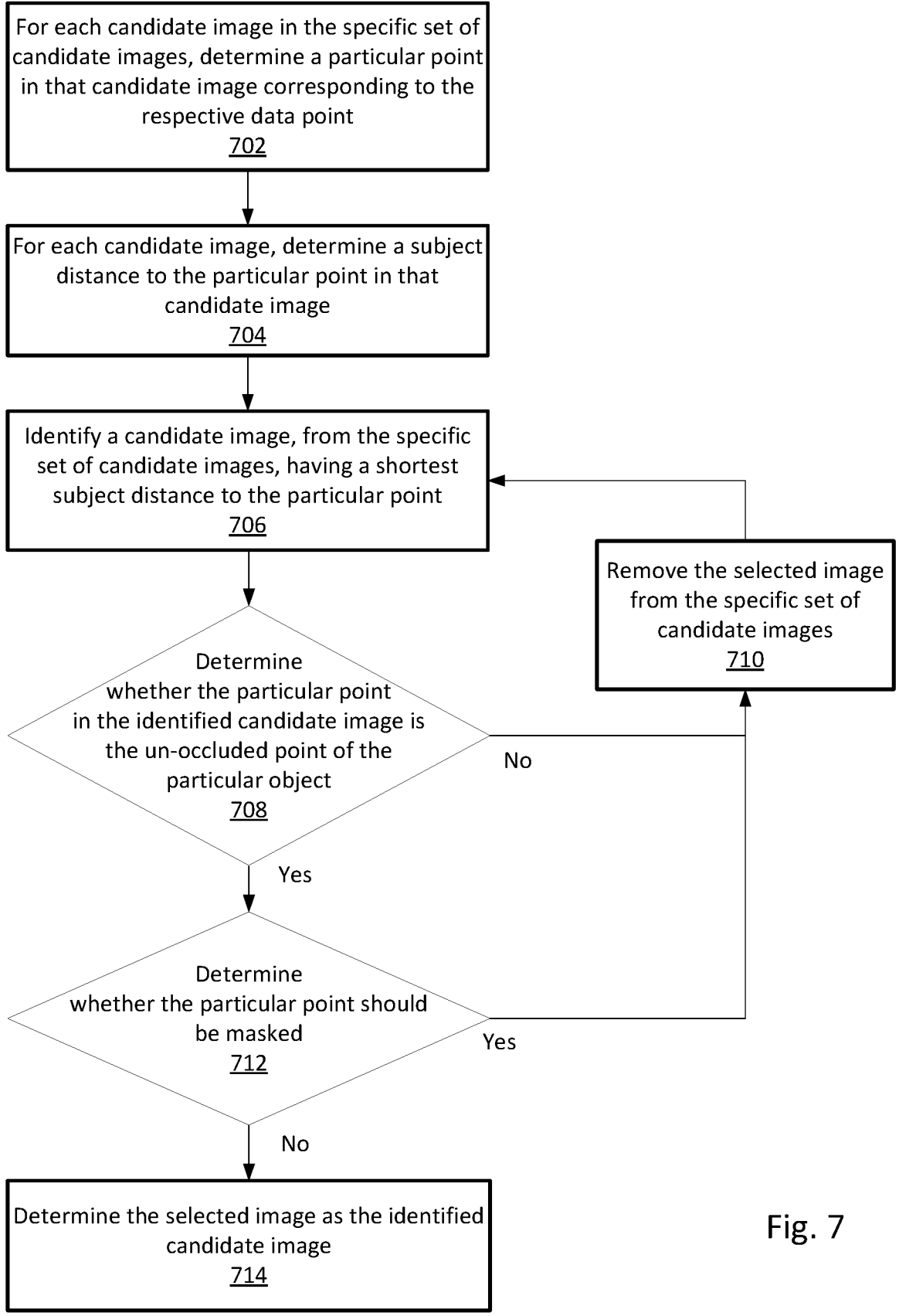
FIG. 7 shows a method for selecting an image, from a subset of the plurality of candidate images that include an un-occluded point of the particular object corresponding to the respective data point, that has a shortest subject distance to the un-occluded point of the particular object, in accordance with one embodiment.

FIG. 7 shows a method 700 for selecting an image, from a subset of the plurality of candidate images that include an un-occluded point of the particular object corresponding to the respective data point, that has a shortest subject distance to the un-occluded point of the particular object, in accordance with one or more embodiments.

At step 702, for each candidate image in a specific set of candidate images, a particular point in that candidate image corresponding to the respective data point is determined. The specific set of candidate images may initially include the plurality of candidate images acquired at step 604. The particular point (e.g., a coordinate) in the candidate image that corresponds to the respective data point is determined by mapping the coordinate of the respective data point (in a 3D coordinate system of the point cloud) to a coordinate in a coordinate system of the candidate image. In one embodiment, the coordinate of the respective data point is mapped to a coordinate in a coordinate system of the candidate image according to the camera model equation of Equation 1:

$$\text{Coord}_{image} = ((\text{Coord}_{data\ point} - \text{POS}_{camera})\text{Rot}_{camera}^{-1})\text{Proj}_{camera}^{-1} \quad \text{(Equation 1)}$$

where $\text{Coord}_{image}$ is the coordinate of the particular point corresponding to the respective data point in a coordinate system of the candidate image, $\text{Coord}_{data\ point}$ is a coordinate of the respective data point in a coordinate system of the point cloud, $\text{Pos}_{camera}$ is the position of image acquisition device 104 at the time when the candidate image was acquired, $\text{Rot}_{camera}^{-1}$ is the rotation or orientation of image acquisition device 104 at the time when the candidate image was acquired, and $\text{Proj}_{camera}^{-1}$ is the matrix representing parameters for mapping a 3D coordinate of the point in the camera's coordinate frame into the an image coordinate. $\text{Coord}_{data\ point}$ is known from the point cloud, while $\text{Pos}_{camera}$ and $\text{Rot}_{camera}$ are measured by devices or sensors (e.g., global navigation satellite system, an inertial measurement unit, wheel sensors, and/or other suitable devices or sensors GPS, not shown) associated with image acquisition device 104. $\text{Proj}_{camera}$ may take different forms depending on the image projection (e.g., spherical projection, pinhole camera model, etc.).

At step 704, for each candidate image in the set of candidate images, a subject distance to the particular point corresponding to the respective data point in that candidate image is determined.

In one embodiment, the subject distance to the particular point in that candidate image is determined based on spatial information in the point cloud. In one embodiment, $\text{Coord}_{data\ point}$ can be solved for in Equation 1 to determine a 3D coordinate (e.g., a data point) in the point cloud corresponding to the particular point in the candidate image, and the distance between the image acquisition device and the corresponding coordinate can be determined from the point cloud as the subject distance to the particular point in the candidate image. In one embodiment, the distance may be calculated by $\sqrt{x^2+y^2+z^2}$, where x, y, and z are components of $\text{Coord}_{data\ point}$, the 3D coordinate in the point cloud corresponding to the particular point in the candidate image. In another embodiment, the point cloud is converted to the coordinate system of the candidate image according to $((\text{Coord}_{data\ point} - \text{Pos}_{camera})\text{Rot}_{camera}^{-1})$. Since the coordinate of the particular point in the candidate image and the position of image acquisition device 104 in the coordinate system of the candidate image are known, the distance subject distance to the particular point in the candidate image may be calculated by $\sqrt{x^2+y^2+z^2}$, where x, y, and z are components the 3D coordinate the particular point in the candidate image.

In another embodiment, the subject distance to the particular point in that candidate image is extracted from a depth map of that candidate image. A depth map of the candidate image is an image that comprises information relating to the subject distance to points of interest (e.g., points corresponding to each of the respective data points) in the particular image. In one embodiment, a depth map for each candidate image is generated in pre-processing stage 600 by processing system 108 and stored in storage 126. The depth map for each candidate image may be generated using any suitable approach, such as, e.g., those known in the art. In one embodiment, a depth map may be generated according to method 900 of FIG. 9, discussed below.

In one embodiment, the subject distance to the particular point in the candidate image may be stored as the coordinate of the particular point in the depth map. For example, the value of the subject distance to the particular point may be stored in each pixel. Since a depth map is generated for the candidate image, the coordinate system of a candidate image and the coordinate system of its corresponding depth map are the same. Accordingly, the coordinate of the point in the coordinate system of the candidate image is the same as the coordinate of the point in the coordinate system of its corresponding depth map.

At step 706, an image is identified, from the specific set of candidate images, having a shortest subject distance to the particular point corresponding to the respective data point. For example, the subject distance to the particular point for each of the candidate images determined at step 704 may be compared with each other and a candidate image having a shortest subject distance to the particular point may be identified.

At step 708, it is determined whether the particular point in the identified candidate image is the un-occluded point of the particular object. In one embodiment, it is determined whether the particular point in the identified candidate image is the un-occluded point of the particular object by performing a comparison between 1) a measured distance (e.g., measured distances 134, 138 of FIGS. 5A and 5B) between the image acquisition device that acquired the identified candidate image (e.g., image acquisition device 104) and a location on the particular object corresponding to the respective data point at a time that the image acquisition device acquired the identified candidate image; and 2) the subject distance (e.g., subject distances 132, 136 of FIGS. 5A and 5B) to the particular point in the identified candidate image. In one embodiment, the measured distance is determined from the point cloud. The subject distance to the particular point in the identified candidate image is determined at step 704.

In one embodiment, comparing the measured distance with the subject distance may include calculating a difference between the measured distance and the subject distance. For example, the difference may be calculated as diff=measured distance−subject distance, where measured distance is the distance between the image acquisition device that acquired the identified candidate image and a location of the particular object corresponding to the respective data point at the time that the image acquisition device acquired the identified candidate image and subject distance is the subject distance to the particular point in the identified candidate image determined at step 704.

In one embodiment, the difference may be compared with a predetermined error threshold to account for error. For example, the error threshold may be 0.5 meters. The particular point is determined to occlude the object 110 in the identified candidate image if the difference diff satisfies (e.g., is greater than) the error threshold.

In response to determining that the particular point in the identified candidate image is not the un-occluded point of the particular object (i.e., the location on the particular object is occluded), method 700 proceeds to step 710 and the specific set of candidate images is updated by removing the identified candidate image from the specific set of candidate images. Image 200 of FIG. 2 is an example of an image having point 130 (of an occlusion 114) occluding object 110. Method 700 returns to step 706 to identify a candidate image from the updated specific set of candidate images.

In response to determining that the particular point in the identified candidate image is the un-occluded point of the particular object (i.e., the location on the particular object is not occluded), method 700 proceeds to (optional) step 712. Image 400 of FIG. 4 is an example of an imaging having point 132 that does not occlude object 110 (i.e., point 132 is an un-occluded point of object 110 corresponding to the respective data point).

Figure 8:
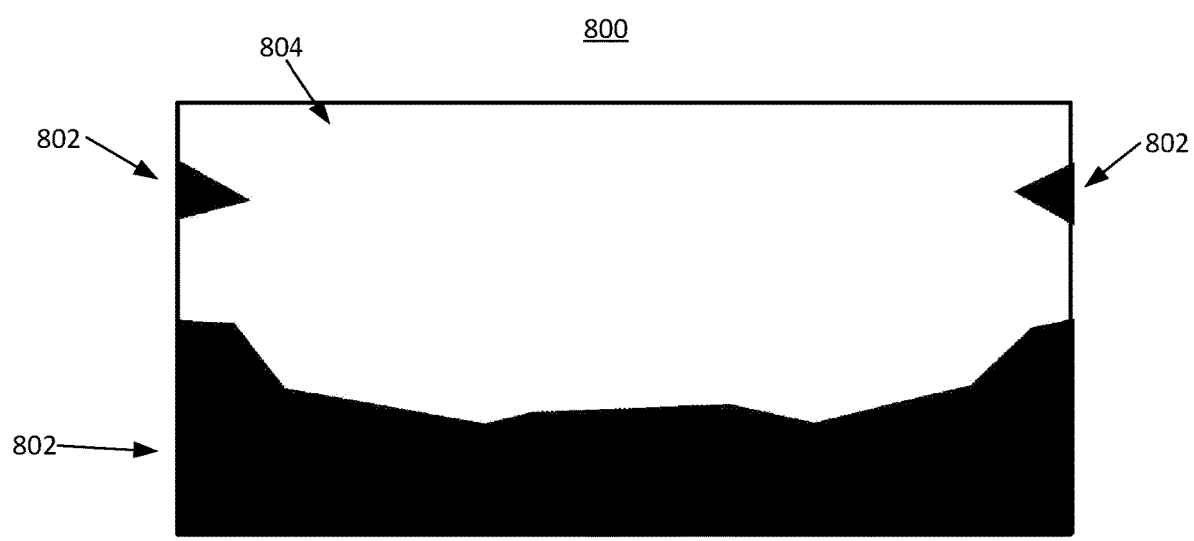
FIG. 8 shows a mask image, in accordance with one embodiment.

At step 712, it is determined whether the particular point in the identified candidate image should be masked. Certain points in the candidate images may be masked to prevent colorizing the respective data point with undesirable objects (e.g., surveying system 102, a vehicle that surveying system 102 is mounted on, etc.). In one embodiment, a pixel intensity value in a mask image at a location (e.g., a coordinate) of the particular point may be determined. The mask image may be a predetermined mask image having masked portions that, e.g., identify undesirable objects present in all image of the specific set of candidate images. In one embodiment, the mask image is generated during preprocessing stage 600 of FIG. 6. FIG. 8 shows an illustrative mask image 800. Masked portions 802 correspond to portions identifying undesirable objects in the set of candidate images. Masked portions 802 are represented in mask image 800 with a non-zero pixel intensity value while unmasked portions 804 are represented in mask image 800 with a zero pixel intensity value.

If the determined pixel intensity value is non-zero, the particular point should be masked. In response to determining that the particular point should be masked, method 700 proceeds to step 710 and the specific set of candidate images is updated to remove the identified candidate image from the specific set of candidate images. Method 700 returns to step 706 to select a candidate image from the updated specific set of candidate images.

If the determined pixel intensity value is zero, the particular point should not be masked. In response to determining that the particular point should not masked, at step 714, the identified candidate image is returned to step 612 of FIG. 6 as the selected image It should be understood that the steps of method 700 may be performed in any suitable order. For example, while method 700 is described by identifying a candidate image having a shortest subject distance to the particular point (step 706) before determining whether the particular point in the identified candidate image is the un-occluded point of the particular object (step 708), method 700 may also be performed by first identifying a subset of the plurality of candidate images that include an un-occluded point of the particular object corresponding to the respective data point, and then identifying a candidate image, from the subset, that has a shortest subject distance to its particular point.

At step 614, the respective data point is colorized based a color in the selected image of the un-occluded point of the particular object corresponding to the respective data point. In one embodiment, the color in the selected image may be a color value (e.g., a red, blue, green (RGB) color value) extracted from the selected image at the un-occluded point of the particular object corresponding to the respective data point. The respective data point is colorized with the extracted color value by applying or assigning the extracted color value to the respective data point. For example, the respective data point may be assigned the extracted RGB color value to colorize the respective data point with the extracted RGB color value.

The embodiments described herein were experimentally applied to colorize a point cloud. The point cloud colorized using the embodiments described herein were compared with point clouds colorized using conventional approaches. It was found that the point cloud colorized using the embodiments described herein accurately colored data points that conventional approaches miscolored due to occlusions.

FIG. 9 shows a method 900 for generating a depth map for a particular image, in accordance with one or more embodiments. Method 900 may be performed as part of preprocessing stage 600 of FIG. 6. Method 900 may be repeated for each respective image in the set of candidate images to generate a depth map for each respective image. The generated depth maps may be used at step 704 of FIG. 7 to determine a subject distance to the particular point in each particular image of the specific set of candidate images.

At step 902, for each specific coordinate of a plurality of coordinates of the respective image, a subject distance to the specific coordinate is determined. The plurality of coordinates may be any coordinates in the respective image, such as, e.g., coordinates corresponding to every pixel of the image. In one embodiment, each coordinate in the plurality of coordinates corresponds to a data point of the set of data points of the point cloud associated with object 110. The plurality of coordinates may be mapped to the coordinate system of the respective image from coordinates of the data points in a coordinate system of the point cloud, e.g., using Equation 1 described above.

In one embodiment, the subject distance to the specific coordinate in the respective image is determined based on spatial information in the point cloud. For example, the data point corresponding to the specific coordinate in the respective image is determined, e.g., using Equation 1, and the distance between the image acquisition device and the corresponding data point is determined from the point cloud as the subject distance to the specific coordinate in the respective image.

Figure 10:
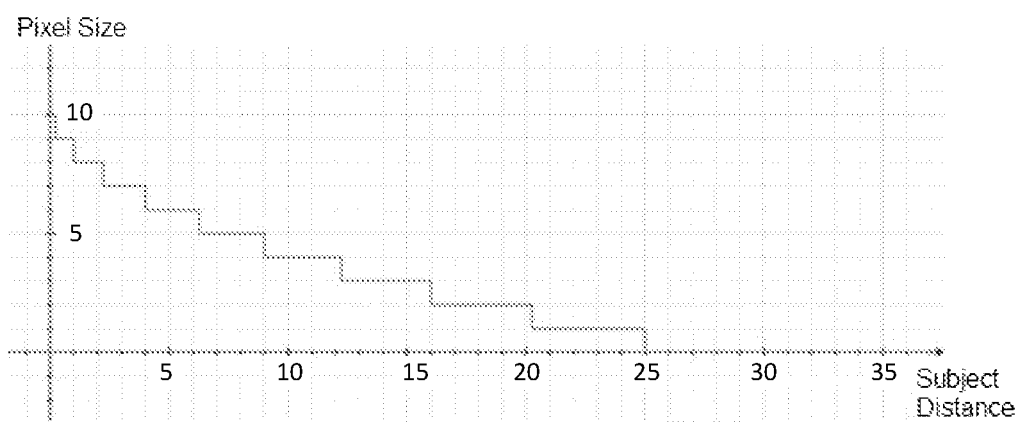
FIG. 10 shows a graph illustrating the relationship between the pixel size and the subject distance in a depth map, in accordance with one embodiment.

At step 904, each specific coordinate is represented based on its subject distance to that specific coordinate in the respective image to provide a depth map. The purpose of this step is to introduce a size to each measurement to fill in the "holes" of the generated depth map and prevent the depth map from being too sparse. In one embodiment, each specific coordinate is represented having a pixel size determined based on its subject distance to that specific coordinate in the respective image. For example, the pixel size may be determined according to Equation 2.

$$\text{Pixel Size} = 10 - \min(\text{floor}(2 \times \sqrt{\text{SubjectDistance}}), 10) \quad \text{(Equation 2)}$$

where pixel size is the size of the pixel determined for the specific coordinate and subject distance is the subject distance to the specific coordinate in the respective image. The relationship between the pixel size and the subject distance in Equation 2 is shown by graph 1000 of FIG. 10. Other suitable approaches may be employed to represent coordinates in a depth map.

At step 906, the subject distance to each specific coordinate in the respective image is stored in the depth map. In one embodiment, the value of the subject distance is stored in each pixel.

The depth map should retain the subject distance information for its closest points. For example, when a coordinate is represented with a larger pixel size, to ensure that surrounding pixels are not overwritten with information indicating longer subject distances, the subject distance determined at step 902 is compared with the current subject distance stored in the depth map. The current subject distance is overwritten if the determined subject distance is shorter than the current subject distance.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 6, 7, and 9. Certain steps of the methods described herein, including one or more of the steps of FIGS. 6, 7, and 9, may be performed by a server or by another processor in a network-based cloud-computing system. Certain steps of the methods described herein, including one or more of the steps of FIGS. 6, 7, and 9, may be performed by a client computer in a network-based cloud computing system. The steps of the methods described herein, including one or more of the steps of FIGS. 6, 7, and 9, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 6, 7, and 9, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Processing system 108 of FIGS. 1 and 3 shows a high-level block diagram of an example computing device that may be used to implement systems, apparatus, and methods described herein. Processing system 108 includes a processor 128 operatively coupled to a data storage device 126 and a memory 124. Processor 128 controls the overall operation of processing system 108 by executing computer program instructions that define such operations. The computer program instructions may be stored in data storage device 126, or other computer readable medium, and loaded into memory 124 when execution of the computer program instructions is desired. Thus, the method steps of FIGS. 6, 7, and 9 can be defined by the computer program instructions stored in memory 124 and/or data storage device 126 and controlled by processor 128 executing the computer program instructions. For example, the computer program instructions can be implemented as computer executable code programmed by one skilled in the art to perform the method steps of FIGS. 6, 7, and 9. Accordingly, by executing the computer program instructions, the processor 128 executes the method steps of FIGS. 6, 7, and 9. Processing system 108 may also include one or more network interfaces (not shown) for communicating with other devices via a network. Processing system 108 may also include one or more input/output (I/O) devices (not shown) that enable user interaction with processing system 108 (e.g., display, keyboard, mouse, speakers, buttons, etc.).

Processor 128 may include both general and special purpose microprocessors, and may be the sole processor or one of multiple processors of processing system 108. Processor 128 may include one or more central processing units (CPUs), for example. Processor 128, data storage device 126, and/or memory 124 may include, be supplemented by, or incorporated in, one or more application-specific integrated circuits (ASICs) and/or one or more field programmable gate arrays (FPGAs).

Data storage device 126 and memory 124 each include a tangible non-transitory computer readable storage medium. Data storage device 126 and memory 124 may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices may include peripherals, such as a printer, scanner, display screen, etc. For example, input/output devices may include a display device such as a cathode ray tube (CRT) or liquid crystal display (LCD) monitor for displaying information to the user, a keyboard, and a pointing device such as a mouse or a trackball by which the user can provide input to processing system 108.

Any or all of the systems and apparatus discussed herein, including image acquisition device 104 and scanner 106 of FIGS. 1 and 3, may also be implemented using one or more computing devices.

One skilled in the art will recognize that an implementation of an actual computing device may have other structures and may contain other components as well, and that processing system 108 of FIGS. 1 and 3 is a high level representation of some of the components of such a computing device for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for colorizing a set of point cloud data points associated with a particular object using a plurality of candidate images comprising:
   for each respective data point in the set of point cloud data points:
      selecting, from a subset of the plurality of candidate images that include an un-occluded point of the particular object corresponding to the respective data point, an image having a shortest subject distance to the un-occluded point of the particular object; and
      colorizing the respective data point based on a color in the selected image of the un-occluded point of the particular object corresponding to the respective data point.

2. The method of claim 1, wherein selecting, from a subset of the plurality of candidate images that include an un-occluded point of the particular object corresponding to the respective data point, an image having a shortest subject distance to the un-occluded point of the particular object comprises:
   identifying the subset of the plurality of candidate images; and
   determining a candidate image, from the identified subset of the plurality of images, that has a shortest subject distance to the un-occluded point of the particular object.

3. The method of claim 2, wherein identifying the subset of the plurality of candidate images comprises, for each respective candidate image in the plurality of candidate images:
   performing a comparison between:
      a distance from an image acquisition device that acquired the respective candidate image to a location on the particular object corresponding to the respective data point at a time that the image acquisition device acquired the respective candidate image, and
      a subject distance to a particular point in the respective candidate image corresponding to the respective data point; and
   determining whether the respective candidate image includes an un-occluded point of the particular object based on the comparison.

4. The method of claim 1, wherein selecting, from a subset of the plurality of candidate images that include an un-occluded point of the particular object corresponding to the respective data point, an image having a shortest subject distance to the un-occluded point of the particular object comprises:
   a) identifying a candidate image, from a specific set of candidate images initially comprising the plurality of candidate images, having a shortest subject distance to a particular point corresponding to the respective data point;
   b) determining whether the particular point in the identified candidate image is an un-occluded point of the particular object;
   c) in response to determining that the particular point in the identified candidate image is not an un-occluded point of the particular object, removing the identified candidate image from the specific set of candidate images and repeating steps a) and b) until it is determined that the particular point in the identified candidate image is an un-occluded point of the particular object; and
   d) in response to determining that the particular point in the identified candidate image is an un-occluded point of the particular object, determining the selected image to be the identified candidate image.

5. The method of claim 4, wherein determining whether the particular point in the identified candidate image is the un-occluded point of the particular object comprises:
   performing a comparison between:
      a distance from an image acquisition device that acquired the identified candidate image to a location on the particular object corresponding to the respective data point at a time that the image acquisition device acquired the identified candidate image, and
      a subject distance to the particular point in the identified candidate image; and
   determining whether the particular point in the identified candidate image is the un-occluded point of the particular object based on the comparison.

6. The method of claim 5, wherein determining whether the particular point in the identified candidate image is the un-occluded point of the particular object based on the comparison comprises:

determining whether the comparison satisfies an error threshold.

7. The method of claim 1, wherein colorizing the respective data point based on the selected image comprises:
extracting a color value from the un-occluded point of the particular object in the selected image; and
assigning the extracted color value to the respective data point.

8. The method of claim 1, wherein selecting, from a subset of the plurality of candidate images that include an un-occluded point of the particular object corresponding to the respective data point, an image having a shortest subject distance to the un-occluded point of the particular object comprises:
determining that the un-occluded point in the selected image should not be masked based on a pixel intensity value at a coordinate in a mask image corresponding to the particular point.

9. The method of claim 8, wherein determining that the un-occluded point in the selected image should not be masked based on a pixel intensity value at a coordinate in a mask image corresponding to the particular point comprises:
determining that the un-occluded point in the selected image should not be masked when the pixel intensity value is zero.

10. The method of claim 1, further comprising:
determining the un-occluded point of the particular object corresponding to the respective data point by mapping a coordinate of the respective data point in a coordinate system of the point cloud to a coordinate in a coordinate system of the selected image.

11. An apparatus, comprising:
a processor; and
a memory to store computer program instructions for colorizing a point cloud comprising a set of data points, the computer program instructions when executed on the processor cause the processor to perform operations comprising:
for each respective data point in the set of point cloud data points:
selecting, from a subset of the plurality of candidate images that include an un-occluded point of the particular object corresponding to the respective data point, an image having a shortest subject distance to the un-occluded point of the particular object; and
colorizing the respective data point based on a color in the selected image of the un-occluded point of the particular object corresponding to the respective data point.

12. The apparatus of claim 11, wherein selecting, from a subset of the plurality of candidate images that include an un-occluded point of the particular object corresponding to the respective data point, an image having a shortest subject distance to the un-occluded point of the particular object comprises:
identifying the subset of the plurality of candidate images; and
determining a candidate image, from the identified subset of the plurality of images, that has a shortest subject distance to the un-occluded point of the particular object.

13. The apparatus of claim 12, wherein identifying the subset of the plurality of candidate images comprises, for each respective candidate image in the plurality of candidate images:
performing a comparison between:
a distance from an image acquisition device that acquired the respective candidate image to a location on the particular object corresponding to the respective data point at a time that the image acquisition device acquired the respective candidate image, and
a subject distance to a particular point in the respective candidate image corresponding to the respective data point; and
determining whether the respective candidate image includes an un-occluded point of the particular object based on the comparison.

14. The apparatus of claim 11, wherein selecting, from a subset of the plurality of candidate images that include an un-occluded point of the particular object corresponding to the respective data point, an image having a shortest subject distance to the un-occluded point of the particular object comprises:
a) identifying a candidate image, from a specific set of candidate images initially comprising the plurality of candidate images, having a shortest subject distance to a particular point corresponding to the respective data point;
b) determining whether the particular point in the identified candidate image is an un-occluded point of the particular object;
c) in response to determining that the particular point in the identified candidate image is not an un-occluded point of the particular object, removing the identified candidate image from the specific set of candidate images and repeating steps a) and b) until it is determined that the particular point in the identified candidate image is an un-occluded point of the particular object; and
d) in response to determining that the particular point in the identified candidate image is an un-occluded point of the particular object, determining the selected image to be the identified candidate image.

15. The apparatus of claim 11, wherein selecting, from a subset of the plurality of candidate images that include an un-occluded point of the particular object corresponding to the respective data point, an image having a shortest subject distance to the un-occluded point of the particular object comprises:
determining that the un-occluded point in the selected image should not be masked based on a pixel intensity value at a coordinate in a mask image corresponding to the particular point.

16. A non-transitory computer readable medium storing computer program instructions for colorizing a point cloud comprising a set of data point, which, when executed on a processor, cause the processor to perform operations comprising:
for each respective data point in the set of point cloud data points:
selecting, from a subset of the plurality of candidate images that include an un-occluded point of the particular object corresponding to the respective data point, an image having a shortest subject distance to the un-occluded point of the particular object; and
colorizing the respective data point based on a color in the selected image of the un-occluded point of the particular object corresponding to the respective data point.

17. The non-transitory computer readable medium of claim 16, wherein selecting, from a subset of the plurality of candidate images that include an un-occluded point of the particular object corresponding to the respective data point, an image having a shortest subject distance to the un-occluded point of the particular object comprises:
- identifying the subset of the plurality of candidate images; and
- determining a candidate image, from the identified subset of the plurality of images, that has a shortest subject distance to the un-occluded point of the particular object.

18. The non-transitory computer readable medium of claim 16, wherein selecting, from a subset of the plurality of candidate images that include an un-occluded point of the particular object corresponding to the respective data point, an image having a shortest subject distance to the un-occluded point of the particular object comprises:
- a) identifying a candidate image, from a specific set of candidate images initially comprising the plurality of candidate images, having a shortest subject distance to a particular point corresponding to the respective data point;
- b) determining whether the particular point in the identified candidate image is an un-occluded point of the particular object;
- c) in response to determining that the particular point in the identified candidate image is not an un-occluded point of the particular object, removing the identified candidate image from the specific set of candidate images and repeating steps a) and b) until it is determined that the particular point in the identified candidate image is an un-occluded point of the particular object; and
- d) in response to determining that the particular point in the identified candidate image is an un-occluded point of the particular object, determining the selected image to be the identified candidate image.

19. The non-transitory computer readable medium of claim 18, wherein determining whether the particular point in the identified candidate image is the un-occluded point of the particular object comprises:
- performing a comparison between:
  - a distance from an image acquisition device that acquired the identified candidate image to a location on the particular object corresponding to the respective data point at a time that the image acquisition device acquired the identified candidate image, and
  - a subject distance to the particular point in the identified candidate image; and
- determining whether the particular point in the identified candidate image is the un-occluded point of the particular object based on the comparison.

20. The non-transitory computer readable medium of claim 19, wherein determining whether the particular point in the identified candidate image is the un-occluded point of the particular object based on the comparison comprises:
- determining whether the comparison satisfies an error threshold.

* * * * *